UNITED STATES PATENT OFFICE.

WILLIAM ROBERT BARKER AND ARTHUR LEDSAM SAVORY, OF NEW BOND STREET, COUNTY OF MIDDLESEX, ENGLAND.

FOOD FOR INFANTS AND INVALIDS.

SPECIFICATION forming part of Letters Patent No. 313,157, dated March 3, 1885.

Application filed July 25, 1884. (No specimens.)

*To all whom it may concern:*

Be it known that we, WILLIAM ROBERT BARKER and ARTHUR LEDSAM SAVORY, both of New Bond Street, in the county of Middlesex, England, have invented certain new and useful Improvements in the Manufacture of Food for Infants and Invalids, of which the following is a specification.

The object of the present invention is to produce a food for infants and invalids which shall contain all the nutritive properties of fresh milk, and which shall possess in addition all the nutritive properties and advantages of a malted farinaceous food, on the principle of the discoveries of the late Baron Liebig.

This invention consists in a dry granulated or powdered preparation composed of all the solid constituents of fresh unskimmed milk and flour or meal of wheat or other cereals, properly cooked, and malt possessing unimpaired diastatic properties, such preparation, when mixed with a suitable proportion of water, constituting a food which is self-digestive and easily assimilable by infants and invalids.

The invention also consists in the process of compounding such preparation, as hereinafter described. The proportions of the milk, flour or meal, and malt may be somewhat varied in our food preparation; but the proportions, by weight, which have given good results are as follows: flour or meal, one hundred parts; milk, twenty-five parts; malt, thirty parts. The milk and the flour or meal are first intimately mixed, and then subjected in any suitable cooking apparatus or oven to a cooking operation at a temperature which should not be less than 220° Fahrenheit, but which may be increased much above that degree without impairing the quality of the preparation. The cooking process is carried on until the moisture is evaporated and the mass becomes easily friable. To this dry product, reduced to powder, is added the malt in a powdered state, and the two are thoroughly mixed together. This preparation will keep for any length of time, and to render it fit for use it only requires the addition of a suitable quantity of water, which will vary according to the desired strength of the food.

Our preparation differs from other dry malted food preparations in the following particulars: The result of thoroughly cooking the mixture of flour or meal and milk is to render the caseine of the milk in its finely-divided state more easy of digestion, and the starch of the farina more easily acted upon by the malt, as well as to render the food itself more stable and less liable to deterioration, while the malt with which the cooked product is mixed, not having been subjected to the cooking operation, retains its diastatic properties unimpaired, and consequently the digestion of the food, or action by which it is rendered digestible, occurs not in the laboratory, but at the time of using the food.

To sum up, our mixture is a cooked dry malted cereal food enriched by milk constituents, in preparing which food no valuable constituent of the cereal or milk has been rejected; it contains a digestive agent, and is free from any tendency to secondary fermentations inherent in extractiform foods.

We do not claim a food composed of milk, flour or meal, and malt in which all of the said ingredients have been together cooked or subjected to heat; but

What we claim as our invention, and desire to secure by Letters Patent, is—

1. The herein-described dry granulated or powdered food preparation for infants and invalids, containing all the solid constituents of milk and flour or meal of wheat or other cereals in a cooked state in admixture, in about the proportions herein set forth, with malt possessing unimpaired diastatic properties.

2. The method herein described of preparing food for invalids and infants, consisting in, first, mixing flour or meal with fresh milk; secondly, subjecting the mixture to a temperature not less than 220° Fahrenheit for a sufficient time to thoroughly dry and cook the mass; thirdly, reducing the mass to powder, and, finally, adding malt in a powdered state, substantially as herein specified.

WILLIAM ROBERT BARKER.
ARTHUR LEDSAM SAVORY.

Witnesses:
   J. WATT,
   GEO. J. B. FRANKLIN,
*Both of 17 Gracechurch Street, London.*